Figure 7:
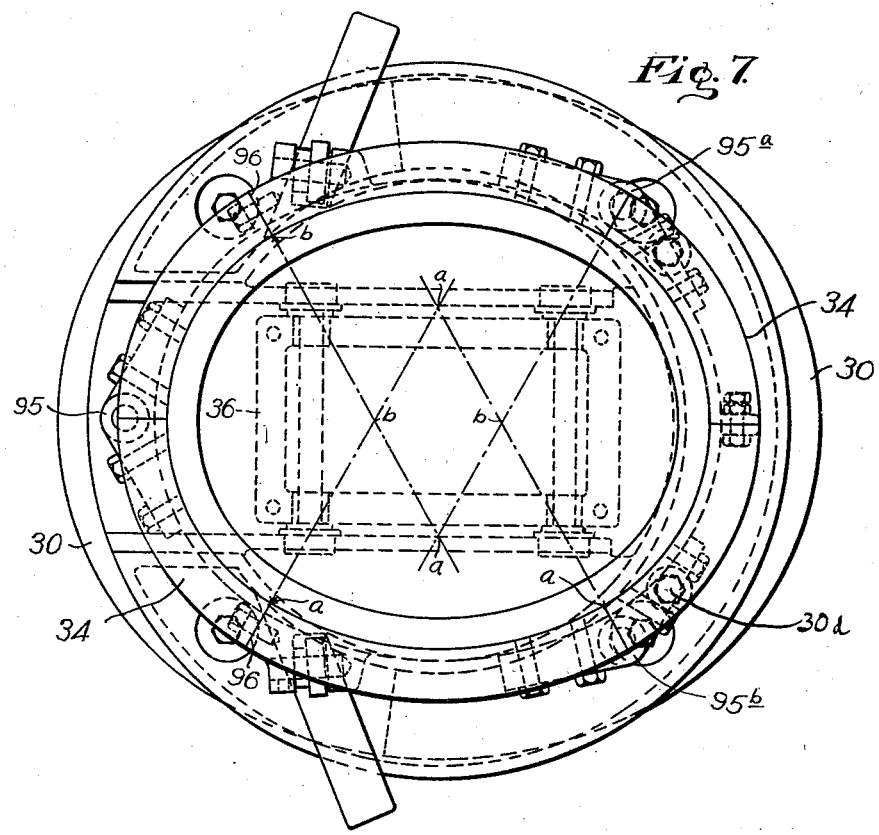

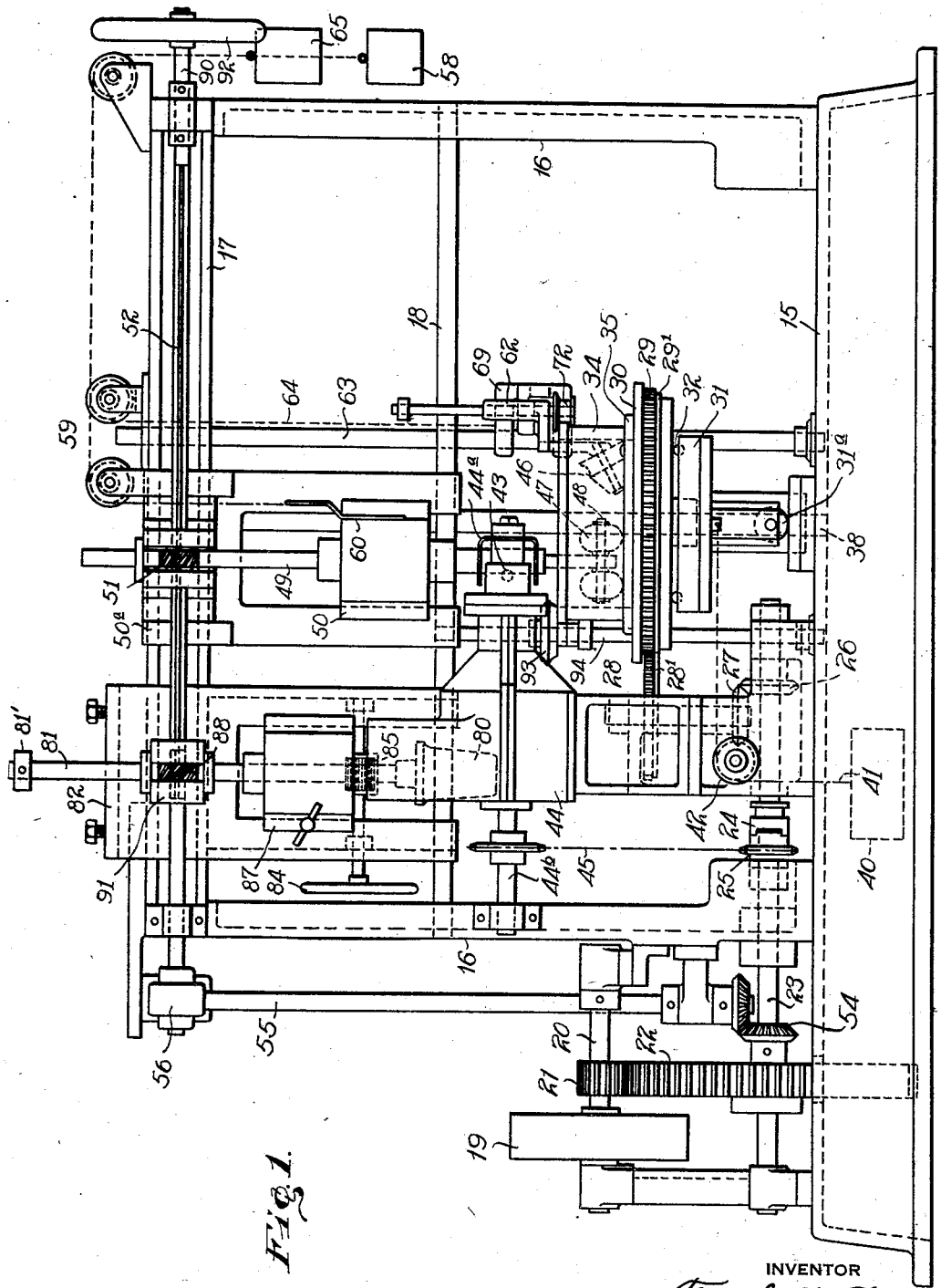

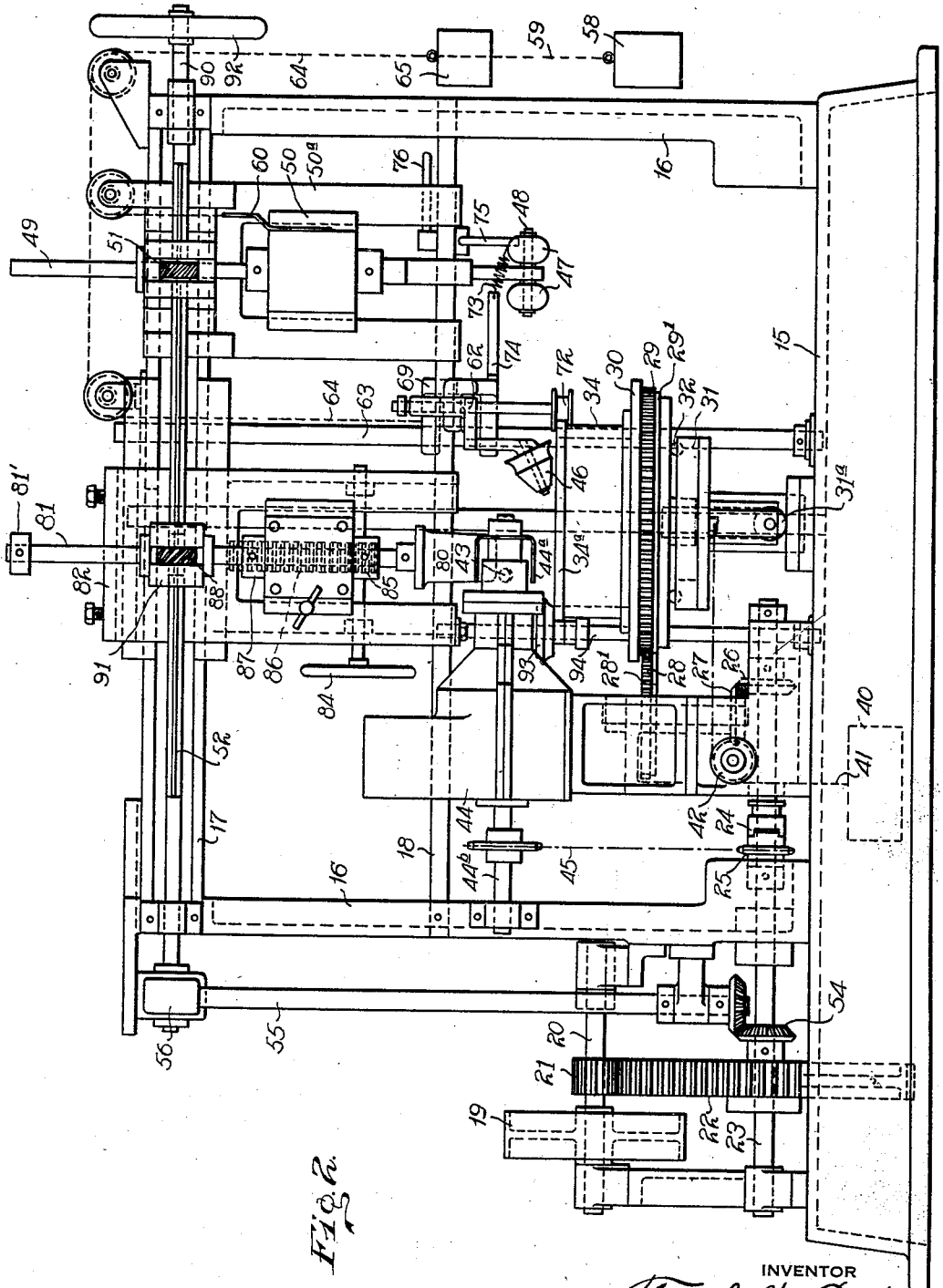

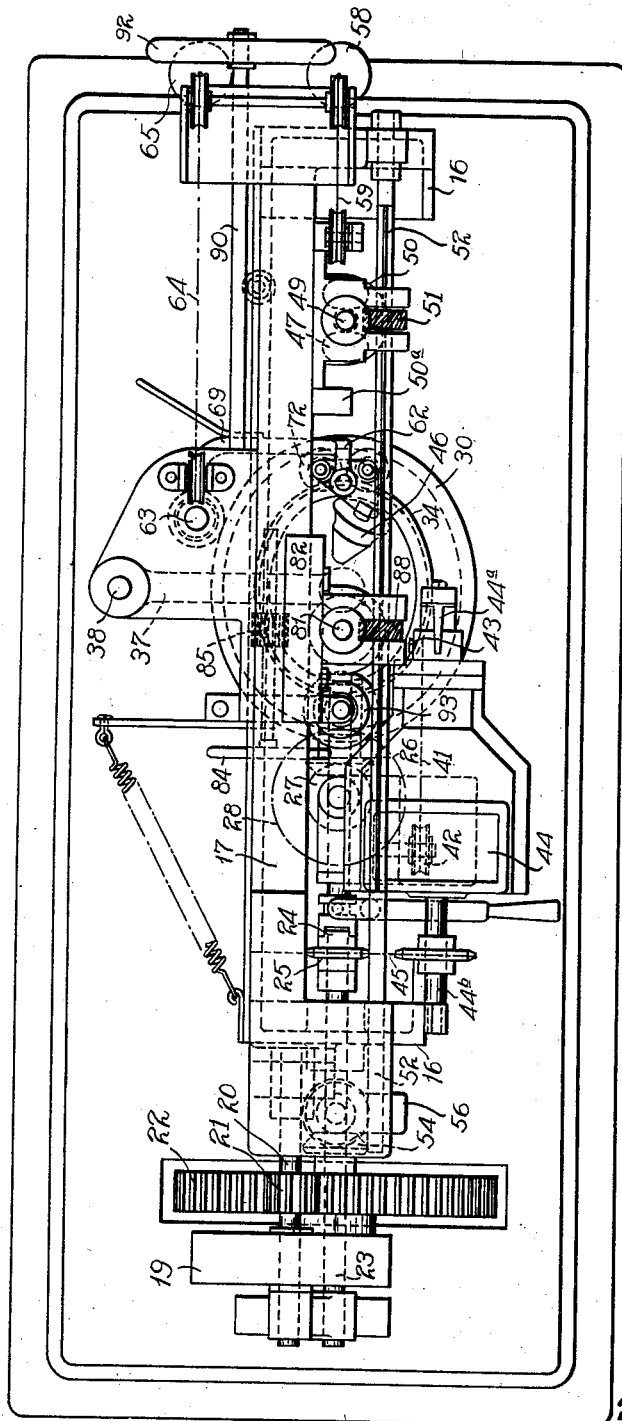
June 21, 1932.   F. W. PRESTON   1,864,319
APPARATUS FOR SHAPING PLASTIC MATERIAL
Filed March 7, 1929   7 Sheets-Sheet 3
INVENTOR
Frank W. Preston,
By Archworth Martin
Attorney

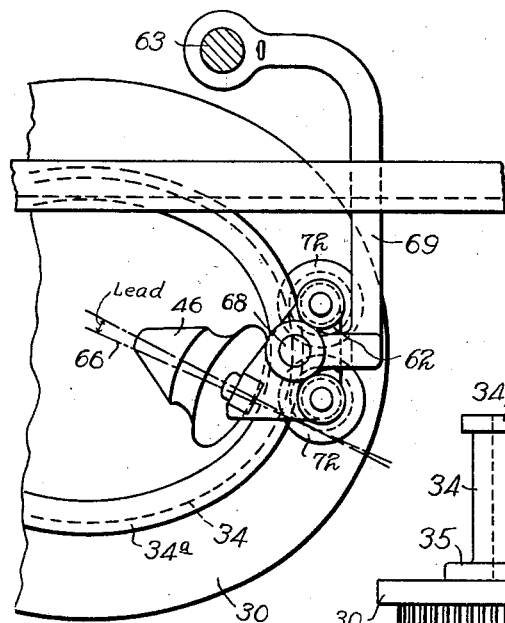
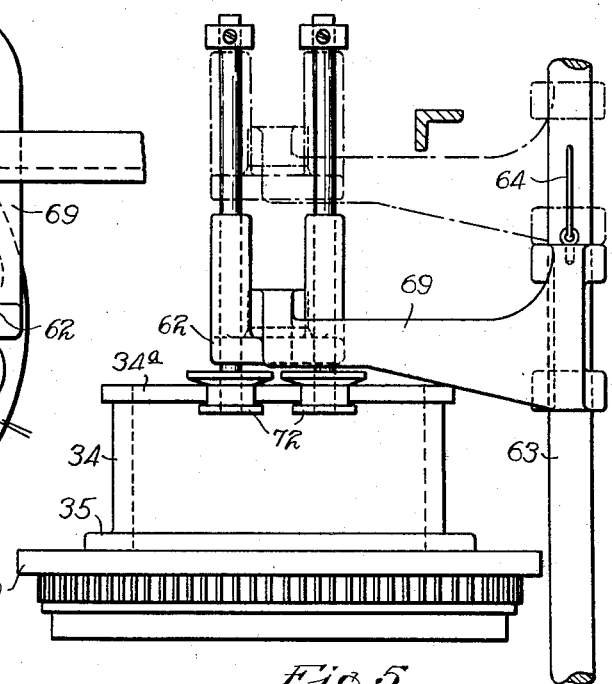
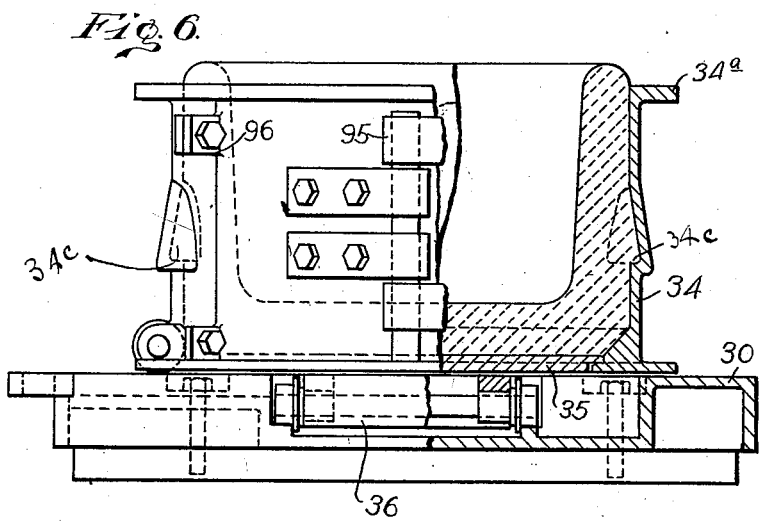

June 21, 1932. F. W. PRESTON 1,864,319
APPARATUS FOR SHAPING PLASTIC MATERIAL
Filed March 7, 1929 7 Sheets-Sheet 6
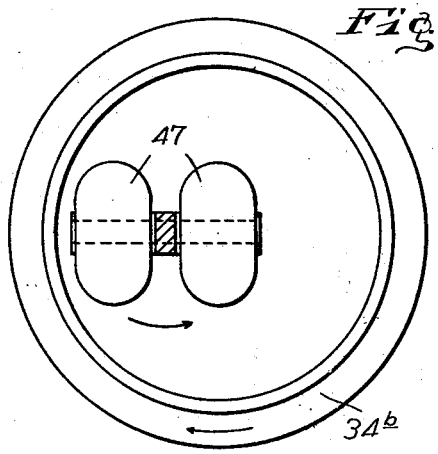
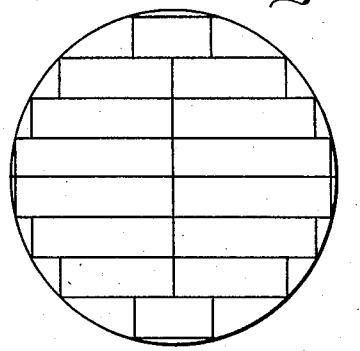
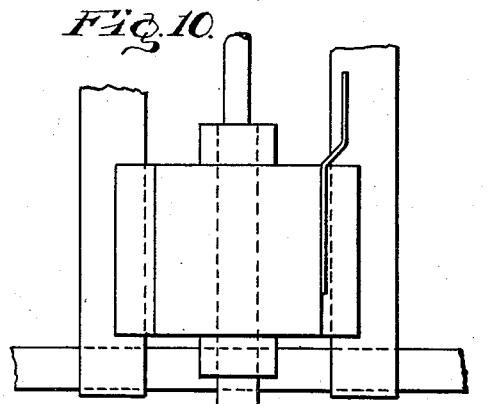
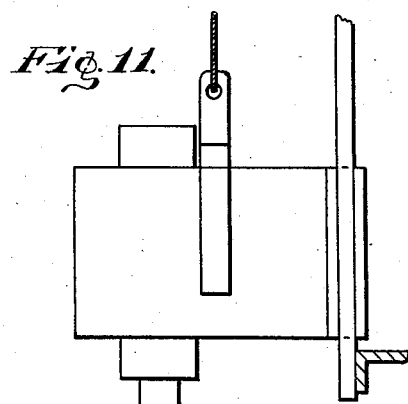
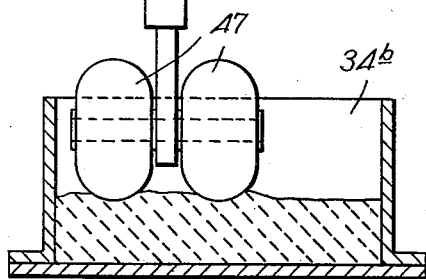
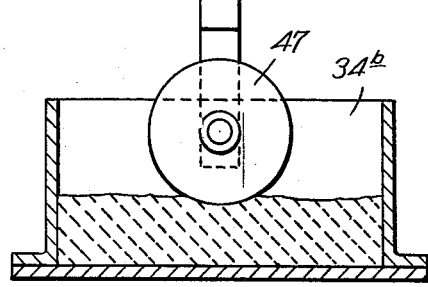
INVENTOR
Frank W. Preston,
By Archworth Martin,
Attorney.

June 21, 1932.  F. W. PRESTON  1,864,319
APPARATUS FOR SHAPING PLASTIC MATERIAL
Filed March 7, 1929  7 Sheets-Sheet 7
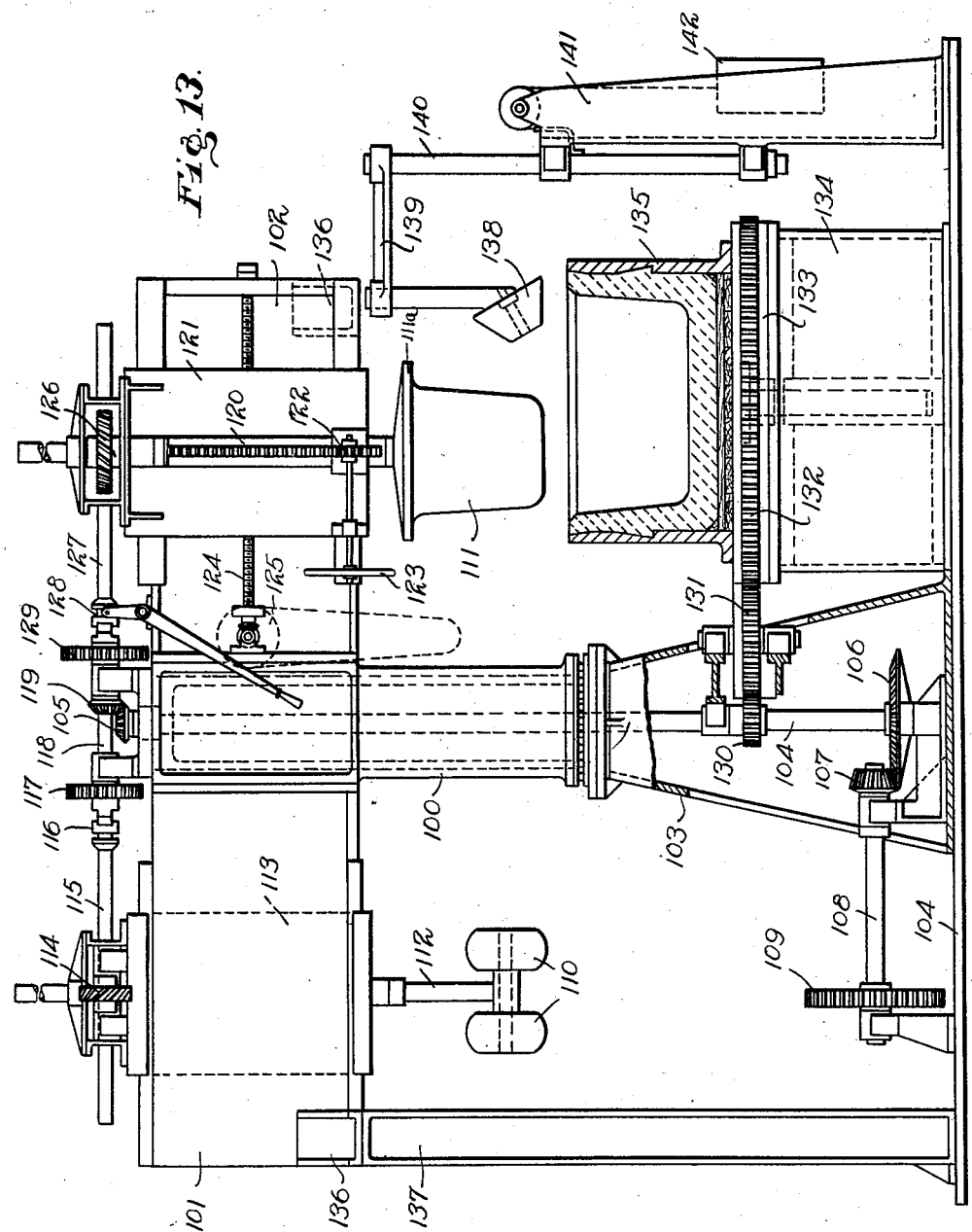
INVENTOR
Frank W. Preston
By Archworth Martin,
Attorney.

Patented June 21, 1932

1,864,319

UNITED STATES PATENT OFFICE

FRANK W. PRESTON, OF BUTLER, PENNSYLVANIA

APPARATUS FOR SHAPING PLASTIC MATERIAL

Application filed March 7, 1929. Serial No. 344,985.

My invention relates to a method and apparatus for the making of clay bodies such as glass melting pots, tank blocks, etc.

One object of my invention is to provide a means and a method for making pots of oval or elliptical form.

Another object of my invention is to provide an improved method and apparatus for forming flat bodies for pot bottoms, tank blocks, etc., by the use of plastic clay.

Another object of my invention is to provide an improved apparatus and method for forming bodies from plastic clay, in such manner that the clay is densely compacted and wherein the danger of entrapping air within the clay body is avoided.

Another object of my invention is to provide an improved apparatus and method for forming glass melting pots and other bodies from clay having a plastic quality. The clay, which usually is an admixture of burnt ground clay or other grog mixed with a proportion of raw plastic binding clay, by my method is densely compacted. This compacting is effected by the method of supplying the clay in small quantities to the machine and rolling it into approximately the desired form, distorting it by a second roller and then re-rolling, so that by this continued working the entrained air is caused to be released. The clay body by this means becomes dense with the interstices and voids containing air being reduced to a minimum. It is practically impossible by any method to remove all the entrained air in the clay, but by my method the clay is so consolidated by the continued working that any interspaces in the clay are broken up and become relatively small.

By the hand method of making pots the clay walls are built up by adding pieces of clay and kneading and pressing them on by the hands of the workman. It will readily be seen that the placing of a piece of clay on the wall body will entrap a certain amount of air, in fact the resulting mixture is to a certain extent laminated, more especially at the juncture of the pot wall to the bottom. This result is aggravated by the intermittent work of the pot maker who works on a number of pots at the same time and builds a small part of a pot each day, thus the clay already in place is drier than that added.

By my method, I use a drier and less plastic clay than by the hand method, as I am able to supply sufficient force to work the drier clay. This is of great advantage as the moisture content of a finished clay pot is considerable, and the greater the moisture the greater the contraction on drying. The drying, unless the clay is thoroughly compacted, will leave voids. There is another advantage in my ability of using a clay of relatively dry consistency in that I can use a mixture of clays with a greater proportion of burnt clay and less plastic clay so that the pot will have a greater refractory quality. Any voids in the clay body are most deleterious, as the flux materials of the glass which is melted in the clay pot will enter these voids, attack the clay wall or bottom and eventually work through.

A further object of my invention is to provide a manner of forming glass-melting pots and the like that are accurately shaped and smoothly finished.

Still another object of my invention is to simplify and improve generally the art of manufacturing clay bodies.

Figure 8:
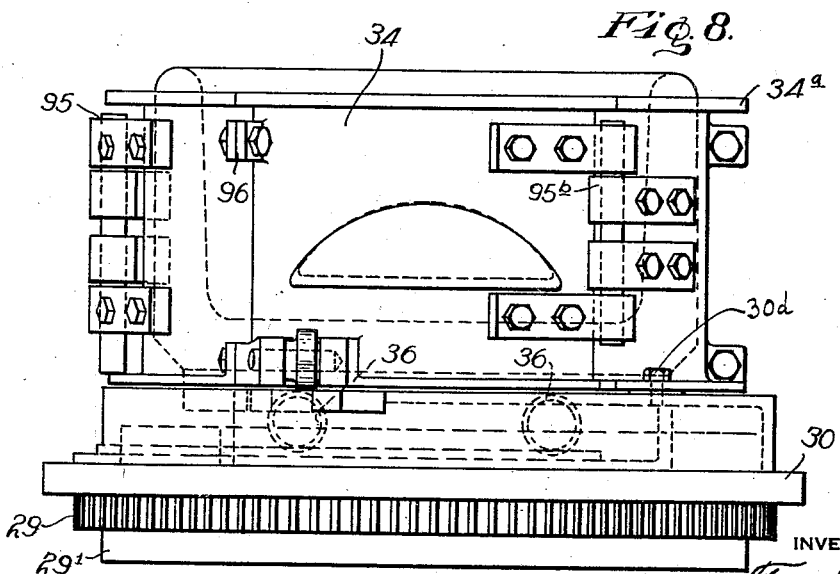

Some of the forms which my invention may take are shown in the accompanying drawings wherein Figure 1 is a side elevational view of a pot forming machine; Fig. 2 is a view similar to Fig. 1, but showing certain of the clay-shaping elements in other positions; Fig. 3 is a plan view of the machine of Fig. 2; Fig. 4 is a plan view of a portion of the machine, on an enlarged scale; Fig. 5 is an elevational view of the apparatus of Fig. 4; Fig. 6 is an enlarged view, partially in elevation and partially in section of certain of the mold parts of the structures of Figs. 1 and 2; Fig. 7 is a plan view of the structure of Fig. 6; Fig. 8 is an elevational view thereof taken at right angles to the showing of Fig. 6; Fig. 9 is a sectional plan view of a portion of the apparatus of Fig. 1, showing a manner in which said portion of apparatus may be employed for building solid clay bodies; Fig. 10 is an elevational view thereof; Fig. 11 is a view thereof taken at right angles to Fig. 10; Fig. 12 shows the manner in which a block formed by the apparatus of Figs. 9 to 11 may be cut or divided to form tank blocks, etc., and Fig. 13 shows a modification of the structure of Fig. 1.

Referring to Figs. 1 and 3, the apparatus may suitably consist of a base 15 having a framework composed of uprights 16 and cross bars or guide rails 17 and 18. A pulley 19 is supported from the base 15 in suitable bearings and may be driven from a source of power (not shown). The pulley 19 is mounted on a shaft 20 which carries a pinion 21 that meshes with a gear wheel 22 that in turn drives a shaft 23. The shaft 23 has a clutch connection 24 with a sprocket wheel 25 and carries a bevel pinion 26 which drives a gear wheel 27 that is mounted on a shaft which carries a gear wheel 28.

The gear wheel 28 meshes with a ring gear 29 on a mold table 30. The mold table 30 is supported upon a movable platform 31 through the medium of anti-friction balls 32, so that the table may be freely rotated upon the platform 31 by means of the driving connections above-described.

In the forming of pots that are elliptical, oval or of other form than circular in horizontal cross section, I provide a mold 34 of the desired form with the mold table 30 to correspond, having the ring gear 29 elliptical and provided with shrouds 29.1 which form contact with the shrouds 28.1 of the gear wheel 28. The periphery of the gear 29 and its shrouds 29.1 is elliptical or of such a form as when rotated the revolving motion of the table 30 will conform to the contour of the pot mold 34.

The mold table 30 serves as a support for the side walls 34 and the bottom wall 35 of a mold, the bottom wall 35 being shown as mounted upon a truck 36 (Fig. 6) so that the clay body can be readily transferred from the mold table upon completion of the mold operation and withdrawal of the shaping devices. If elliptical pots are to be made, the mold will be of corresponding form. The side walls of the mold 34 are provided with offsets or recesses 34° as shown more clearly in Fig. 6, into which clay is forced in the building up of a pot, so that lugs are provided on the walls of the pot by means of which it may be conveniently handled. One section of the mold 34 is rigidly secured to the mold table 30 by means of screws 30ᵈ, as shown more clearly in Figs. 7 and 8. The other sections of the mold are pivotally connected to this fixed section as hereinafter explained.

The platform 31 is supported upon a roller 31a at approximately its mid portion and has an arm 37 (Fig. 3) extending therefrom and pivotally connected at 38 to the base of the machine, so that it will not become displaced. The ring gear 29 is held in mesh with the gear wheel 28 by means of a weight 40 and a cable 41, the cable 41 passing over a guide sheave 42 and being connected to the mold table.

By this arrangement, it will be seen that the mold table may be easily oscillated about the pivot 38 and the gear wheels 28 and 29 be held in driving engagement, notwithstanding the oval form of the gear 29. This is important in the forming of elliptical pots because the shaping devices as hereinafter described must be properly located with respect to the interior surface of the pot being formed.

When a mold has been placed upon a mold table and the parts are set in operation, clay is supplied to the interior of the mold through the spout 43 of a pug mill 44, the pug mill 44 being operated by means of a sprocket chain 45 that is driven from the shaft 23. The spout 43 is located so as to deposit material in that portion of the mold which is adjacent to the gear wheel 28, thus permitting the clay to be deposited in a non-oscillating mold zone and quite close to its vertical wall.

As the clay is extruded at a desired rate of travel from the spout 43 of the pug mill in sausage-like form, it is cut into short uniform lengths by knife members 44a that are mounted on the pug mill shaft 44b, and falls upon the mold bottom 35 and is compacted thereon by a consolidating roll 46 and bottom-forming rolls 47.

The bottom-forming rolls 47 are idle on a shaft 48 the shaft 48 being carried by a vertical shaft 49 that is journaled in a vertically-slidable block 50 which is counterpoised as hereinafter explained, and is slidably supported in a guide block 50a that is supported for horizontal sliding movement on the rails 17 and 18.

This shaft is driven by means of helical gears 51 one of which is slidably keyed to the shaft 49 and the other of which is slidably keyed on a horizontal shaft 52, to permit vertical and radial shifting of the shaft 49 without breaking the driving connection of the helical gears 51.

The shaft 52 is driven from the shaft 23 through bevel gearing 54, a shaft 55, and suitable gearing indicated at 56. While the shaft 49 and the mold table 30 are both driven from the shaft 23, the gear connections are so arranged that the shaft 49 will turn in a direction opposite to the direction of rotation of the mold table 30.

The block 50 is counter-weighted by means of a weight 58 and a cable 59 which passes over guide sheaves and is connected to an arm 60 that is secured to the block, so that the bottom-forming rolls 47 will not bear with too great force upon the clay in the bottom of the mold.

The consolidating roll 46 is idly rotatable upon a bracket 62 which is slidably supported upon an upright 63. This bracket is counterweighted by a cable 64 and a weight 65.

As clay is fed into the machine it is first caught by the roller 46 and consolidation thereof to form the bottom of the pot thereupon begins, the roller 46 serving to squeeze the clay and distribute it along the bottom of the mold adjacent to the side wall thereof. As shown more clearly in Fig. 4, the axis of the roller 46 is angular to a radial line 66, the inner end of the axial line of the roller being disposed forwardly of the line 66.

The angular disposition of the roller 46 serves to prevent a considerable portion of clay from passing between the foremost edge of the roller and the pot wall and being compacted against the wall of the mold. In other words, the foremost edge of the roller is closer to the mold wall than is the rearmost edge thereof, so that this conical roller will not cut off a fin of clay or wipe it against the wall of the mold to such an extent that any oil or other lubricating agent applied to the wall will be rubbed off.

The axis of the roller is also inclined as shown in Fig. 1, so that its bottom surface will be substantially parallel to the bottom of the mold, and the roller may be grooved as shown, or plane. The groove in the roller serves to guide the clay into proper position for squeezing by diverting it from immediate proximity to the mold wall where it could not be squeezed adequately and where a portion would be cut off by the outer edge of the roll.

By making the roller 46 conical and having its bottommost surface parallel to the mold bottom, the outer lowermost edge, that is the lowermost part of the enlarged end of the roller can be brought more closely to the mold wall than if the roller were cylindrical and with its axis in parallelism with the plane of the mold bottom. The conical arrangement, therefore, permits of compacting of the clay in closer proximity to the mold wall than if the roller 46 were cylindrical.

The bracket 62 which carries the roller 46 is pivotally supported upon a rod 68 to which is connected a frame 69 that is pivoted at 63. Therefore when the roller is raised clear of the mold, it may be swung outwardly clear of the mold. The bracket 62 carries guide rollers 72 that engage the rim 34a of the mold. The rollers 72 are yieldably held in engagement with the mold by means of a spring 73 whose one end is connected to an extension 74 of the frame 69 (Fig. 2), and whose other end is connected to a movable anchoring device 75 which is actuated by a handle 76, to release the tension of the spring. The rollers 72 being yieldably held in engagement with the wall of the mold insures that the roller 46 will be maintained in properly spaced position with respect to the vertical wall of the mold, during rotation of the mold.

As clay accumulates on the bottom of the mold, the roller 46 will gradually move upwardly, such roller bearing on the clay with a pressure determined by the weight of the counterpoise 65.

As the clay is forced toward the center of the mold it is caught beneath the rollers 47 which are counter-poised to such extent that they will compact the clay into a solid mass but not with such force that they will sink very deeply into the clay. Owing to the fact that the shaft 49 which carries the bottom forming rollers 47 is rotated in a direction opposite to the rotation of the mold table, the clay will be forced somewhat toward the center of the mold instead of toward the side walls thereof, the rollers 47 passing over the center of the mold, however, to produce a pot bottom of uniform thickness.

When the bottom of the pot has been completed, the rollers 47 are elevated above the upper edge of the mold and the slide block 50a which supports the shaft 49 and the rollers is slid along the guide rails 17 and 18 to the position shown in Fig. 2. A side-forming roller 80 is then brought into position within the mold. Movement of the roller from the position shown in Fig. 1 to a position above the mold is effected by shifting the slide block 82 along the rails 17 and 18. When the side roller is in position above the mold, it is lowered by means of a hand wheel 84 which operates a pinion 85 that meshes with rack teeth 86 that are formed on a sleeve 87 which carries the shaft 81.

When the roller 80 is properly positioned with respect to the inner vertical wall of the mold and the bottom wall thereof, it is rotated in the same direction as the mold, by means of helical gear wheels 88, one of which is carried by the shaft 81 and the other of which is slidably keyed to the shaft 52.

Accurate positioning of the roller 80 with respect to the mold wall in order to insure that the vertical wall of the pot will have proper thickness is effected by means of a shaft 90 whose inner end has screw-threaded connection with the bearing block 91 in which the shaft 81 turns, the shaft 90 being provided with a hand wheel 92. The roller 80 need not be counter-weighted since no vertical movement thereof is required during a rolling operation and because it is vertically positioned by a stop collar 81 so its bottom end rests upon the bottom of a pot, and serves to maintain such bottom in a smooth condition. As more clay is fed into the mold, it is caught by the roller 46 and then between the roller 80 and the wall of the mold, and the side of the pot thus built up. During the building up of the side wall of the pot, the roller 46 can be maintained in operation and such roller will rise with the building up of such side wall, as heretofore indicated, and may be counterpoised to a greater degree than in the forming of the pot bottom.

When the pot wall has been built to a sufficient height, and after the consolidating roller 46 ceases to be employed, I may utilize an edge trimming and forming roller 93 which will bear against the upper edge of the pot to smooth the outer portion thereof and to cut off the clay at the desired height, this roller being idly rotatable upon a shaft 94.

Referring now particularly to Figs. 7 and 8, I show a form of mold which may be employed, particularly when large pots are to be made. By this form of mold, the pots may be readily removed from the mold. The vertical walls of the mold are built in sections that are pivotally connected together as indicated at the points 95, 95a and 95b, and are detachably connected at 96 so that when the connection 96 is broken, the mold walls may be swung apart. When the mold sections are swung apart the mold bottom, by reason of the fact that it is carried on a truck 36, may be wheeled, together with the block or pot contained thereon, out of the mold.

The mold is preferably defined by circles struck from points on the major and minor axes thereof, with the arcs of these circles respectively ending on the radial line drawn through the two centers of the respective arcs which forms the point of junction for the opening of the elliptical mold at 95. For example (Fig. 7), the lines a—a represent the radius of a major arc, and the lines b—b the radius of a minor arc. In practice the mold would be made by turning on a boring mill the two large segments which would have the same radius, and in a separate operation the two small segments which are made to a common radius. This greatly facilitates and makes practical the machine method for producing these parts.

In Figs. 9 to 12, I show a means whereby tank blocks may be conveniently formed. In this arrangement, the rollers 47 may be mounted and driven as explained in connection with the discussion of Figs. 1 to 3, to build up a clay body within a mold 34b. A conical consolidating roll similar to the roller 46 may also be employed in conjunction with the roller 47 and the block could be built up as described in connection with the apparatus of Figs. 1 and 3, but omitting the use of the side-forming roller 80 and employing the rollers 47 until the mold had been completely filled with clay.

The clay block thus formed will usually be of circular or curved contour, as such shapes are more readily made by the apparatus heretofore described. The clay body may be thereupon cut into blocks or bricks, as shown in Fig. 12, by means of wires or other suitable cutting implements.

Referring to Fig. 13, the modified pot forming apparatus consists of a rotatable T-head 100 having radially-extending arms 101 and 102, and is supported by a pedestal 103 which is secured to a base plate 104. Anti-friction bearings are provided between the T-head 100 and the pedestal 103 so that the head may be rotated freely when desired.

Extending vertically through the pedestal and head, is a drive shaft 104 which is suitably mounted in bearings and carries a bevel gear 105 at its upper end and a bevel gear 106 at its lower end. The gear 106 is driven by a bevel pinion 107 that is mounted on a shaft 108 and carries a gear 109 which may be driven from any suitable source of power (not shown).

The arms 101 and 102 carry the bottom-forming rolls and the side wall forming roll 110 and 111 respectively, the supporting and driving structure for these rolls being substantially similar to the structure shown in Fig. 1. The bottom-forming rolls 110 are carried by a vertical shaft 112 journaled in a slide block 113 which is slidably supported on the arm 101. The shaft 112 is driven by means of helical gears 114 by the horizontal shaft 115 which has clutch connection 116 through driving gears 117 with a drive shaft 118. The shaft 118 carries a bevel gear 119 that meshes with the bevel gear 105.

The side wall-forming roll 111 is carried by a vertical shaft 120 that is journaled in a block 121 which is slidably supported on the arm 102. The roll 111 may be raised and lowered by means of a rack and pinion 122 operable by the hand wheel 123. The block 121 may be moved horizontally by means of the threaded rod 124 operable by chain-operated sprocket wheel 125. The everted lip 111a of the wall-forming roll 111 serves to smooth and finish off the upper edge of the pot and to cut away surplus material at such edge.

The shaft 120 is driven by means of helical gears 126 by the horizontal shaft 127 which has clutch connection 128 through gears 129 with the drive shaft 118.

The vertical shaft 104 carries a pinion 130 that meshes with a gear wheel 131 journaled in the pedestal 103, and drives a ring gear 132 on a mold table 133 which is supported upon a platform 134. The mold table 133 supports a mold 135 which may be of any desired form.

It will be apparent that either the bottom-forming rolls or the side wall-forming roll may be readily moved into position above the mold by a rotative movement of the head 100. Further movement of the head may be prevented by suitably securing a bracket 136, carried at the outer end of each of the arms 101 and 102, to a standard 137 which is secured to the base 104, thereby holding the structure rigid during the molding operations.

A consolidating roll 138 may be employed if desired, and is shown as being supported upon a bracket 139 which is mounted on a vertical rod 140. The rod is slidably supported upon an upright 141 and has connection with a counter-weight 142. As clay accumulates on the bottom of the mold, the roll 138 will gradually move upwardly, the roll bearing on the clay, with a pressure determined by the weight of the counterpoise 142.

Various modifications and alterations may be made in my machine without departing from the scope of the appended claims.

I claim as my invention:—

1. Apparatus for shaping plastic material, comprising a mold, a bottom-forming roll having its axis horizontal, and mounted in position to operate upon material in the bottom of said mold, and means for imparting rotative movements to the mold and the roll about radially offset axes in planes parallel to the bottom of the mold.

2. Apparatus for shaping plastic material, comprising a mold, a bottom-forming roll mounted in position to operate upon material in the bottom of said mold, means for imparting relative rotative movement to the mold and the roll about radially-offset axes in a plane parallel to the bottom of the mold, and means for causing the roll to bear upon the material in the mold with a predetermined substantially constant force during contact of the roll with the material.

3. Apparatus for shaping plastic material, comprising a mold, a bottom-forming roll mounted in position to operate upon material in the bottom of said mold, means for rotating the mold, and means for bodily rotating the roll in a direction the reverse of the direction of rotation of the mold.

4. Apparatus for shaping plastic material, comprising a mold, a pair of rollers mounted on horizontal axes and in position to engage material in the bottom of the mold, means for rotating said rolls as a unit about an axis perpendicular to the first-named axes, but offset radially from the axis of the mold, and means for imparting relative movement to the mold and the said rolls, in a plane parallel to the bottom of the mold.

5. Apparatus for shaping plastic material comprising a mold, a pair of rollers mounted on horizontal axes and in position to engage material in the bottom of the mold, means for rotating said rolls as a unit about an axis perpendicular to the first-named axes, and means for imparting relative movement to the mold and the said rolls, in a plane parallel to the bottom of the mold, the vertical axis of rotation of the rolls being positioned to cause at least one of the rolls to periodically pass over the center of the mold.

6. Apparatus for shaping plastic material, comprising a rotatable mold, a material-shaping roller mounted in said mold for rotation about an axis disposed in general parallelism to the bottom of the mold, but extending in a direction tangential to a circle concentric with the axis of the mold.

7. Apparatus for shaping plastic material, comprising a rotatable mold, a material-shaping roller mounted in said mold for rotation about an axis disposed in general parallelism to the bottom of the mold, but extending in a direction tangential to a circle concentric with the axis of the mold, one end of the roller axis being disposed forwardly of the other end thereof, in relation to the direction of rotation of the mold.

8. Apparatus for shaping plastic material comprising a mold, means for compressing material against the sides of the mold, and a lip-forming roll positioned to engage the upper edge of the material shaped in the mold, to define the upper edge of the article formed within the mold.

9. Apparatus for shaping plastic material comprising a mold, a beam disposed above the mold, a plurality of clay working devices supported by said beam, and means permitting movement of said devices horizontally along the beam and vertically with respect thereto for movement thereof into and out of operative position within the mold.

10. Apparatus for shaping plastic material comprising a mold, a beam disposed above the mold, a plurality of clay-working devices supported by said beam, and means permitting movement of said clay-working devices in vertical and horizontal directions into and out of operative positions within the mold.

11. Apparatus for shaping plastic material comprising a mold, a material shaping roller mounted in said mold for rotation about an axis disposed in a direction generally radial to the mold but tangential to a circle concentric with the axis of the mold, and means for constantly maintaining the said tangential relation during a rolling operation.

12. Apparatus for shaping plastic material comprising a mold, a material-shaping roller mounted in said mold for rotation about an axis disposed in a direction generally radial to the mold but tangential to a circle concentric with the axis of the mold, and means for maintaining a definite angularity of the roller axis and the position of the roller with respect to the adjacent portion of a mold wall during a rolling operation.

13. Apparatus for shaping plastic material comprising a mold of non-circular form, a clay working device positioned within the mold, means for rotating the mold, a rim on the mold, a guiding member connected to the said device and engaging said rim, and means for holding the mold rim and the guiding member in engagement during rotation of the mold.

14. Apparatus for shaping plastic material comprising a mold, a lip-forming roll disposed exteriorly of the mold and adapted to engage the upper edge of a body of plastic material shaped within the mold, and means for imparting relative rotative movement to the said roll and the mold.

15. Apparatus for shaping plastic material comprising a mold, an anti-friction support for said mold, a guiding device for engaging a side portion of the mold, means for moving the mold upon said support and maintaining it in contact with said guiding device, and means for shaping material within the mold.

16. Apparatus for shaping plastic material comprising a mold, means for supporting said mold for free movement in a horizontal direction, a guiding device for engaging a side portion of the mold, means for rotating said mold upon said support, means operating upon the support for maintaining the mold in contact with said guiding device, and means for simultaneously shaping material within the mold.

17. Apparatus for shaping plastic material, comprising a mold, a material shaping roller of general conical form, positioned to operate upon clay on the bottom of the mold, the enlarged end of said roller being more remote from the center of the mold than the smaller end thereof and being provided with a circumferential groove.

18. Apparatus for shaping plastic material comprising a mold, a bottom-forming roll mounted in position to operate upon material in the bottom of said mold, means for rotating the mold, and means for bodily rotating the roll in a direction the reverse of the direction of rotation of the mold, the roll being given a plurality of revolutions during one revolution of the mold.

19. Apparatus for shaping plastic material, comprising a mold, a mold base, a mold table, means for shaping material within the mold, a truck for supporting the mold base, a ring gear on the mold table, a driving pinion meshing with said gear, and means yieldably urging the truck and the mold table toward said pinion for maintaining the pinion and gear in driving engagement.

20. Apparatus for shaping plastic material comprising a mold, a mold base, a mold table, means for shaping material within the mold, a truck for supporting the mold base, a non-circular ring gear on the mold table, a driving pinion meshing with said gear, and means yieldably urging the truck and the mold table toward said pinion for maintaining the pinion and gear in driving engagement.

21. Apparatus for shaping plastic material comprising a mold, a mold base, a mold table, means for shaping material within the mold, a movable support for the mold base, a ring gear on the mold table, a driving pinion meshing with said gear, and means yieldably urging the support and the mold table toward said pinion, for maintaining the pinion and gear in driving engagement.

22. Apparatus for shaping plastic material comprising a mold base, a clay working device for shaping material within the mold, a truck device rigidly secured to the mold base, a rotatable mold supporting table, means for removably securing said truck in position on the table, and means for supporting said mold table in position beneath said clay-working device.

23. Apparatus for shaping plastic material, comprising a mold having pivotally connected vertical wall sections and a removable bottom wall, a clay-working device for shaping material within the mold, a rotatable mold table having a recess, said vertical walls of the mold being secured to the mold table, and a truck for supporting the bottom wall and movable into said recess to position the bottom wall in cooperating relation with the side walls.

24. Apparatus for shaping plastic material, comprising a mold having pivotally connected vertical wall sections and a removable bottom wall, a truck on the bottom wall, a clay-working device for shaping material within the mold, a rotatable mold table having a recess for receiving said truck, said vertical walls being secured to the said table in position to hold the bottom wall against removal when the side wall is closed, and means for imparting relative rotative movement to the said clay-working device and the mold.

25. Apparatus for forming clay pots and the like, comprising a rotatable table, a mold having vertically divided side walls and supported by said table, a base encloseable within said side walls, and a supporting member for said base movable into position upon said table where the said base can be engaged by the said walls.

In testimony whereof I, the said FRANK W. PRESTON have hereunto set my hand.

FRANK W. PRESTON.